US012756962B2

(12) United States Patent
Choi et al.

(10) Patent No.: US 12,756,962 B2
(45) Date of Patent: Oct. 6, 2026

(54) WEARABLE SPEAKER

(71) Applicant: LG ELECTRONICS INC., Seoul (KR)

(72) Inventors: Dongjun Choi, Seoul (KR); Seungkyu Park, Seoul (KR); Sung Gul Hwang, Seoul (KR); Deung Hwangbo, Seoul (KR); Sunha Park, Seoul (KR); Minkyu Oh, Seoul (KR); Juyoung Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 134 days.

(21) Appl. No.: 18/727,870

(22) PCT Filed: May 2, 2022

(86) PCT No.: PCT/KR2022/006248
§ 371 (c)(1),
(2) Date: Jul. 10, 2024

(87) PCT Pub. No.: WO2023/163284
PCT Pub. Date: Aug. 31, 2023

(65) Prior Publication Data

US 2025/0097617 A1 Mar. 20, 2025

(30) Foreign Application Priority Data

Feb. 22, 2022 (KR) ........................ 10-2022-0023256

(51) Int. Cl.
*H04R 1/02* (2006.01)
*H02J 50/00* (2016.01)
(Continued)

(52) U.S. Cl.
CPC ............ *H04R 1/026* (2013.01); *H02J 50/005* (2020.01); *H02J 50/10* (2016.02); *H02J 50/70* (2016.02);
(Continued)

(58) Field of Classification Search
CPC H04R 1/026; H04R 1/1025; H04R 2201/023; H04R 2420/00; H02J 50/10; H02J 50/70; H02J 50/005
See application file for complete search history.

(56) References Cited

U.S. PATENT DOCUMENTS 5,814,968 A * 9/1998 Lovegreen ........... H01M 6/5011
320/113
7,808,392 B1 * 10/2010 Anklesaria ............. A61F 13/42
340/573.5
(Continued)

FOREIGN PATENT DOCUMENTS

CN 212183687 U * 12/2020
KR 20-2010-0002964 U 3/2010
(Continued)

*Primary Examiner* — Joseph Saunders, Jr.
(74) *Attorney, Agent, or Firm* — Birch, Stewart, Kolasch & Birch, LLP

(57) ABSTRACT

A wearable speaker comprises: a speaker module equipped with a audio output unit; and a fixing module magnetically coupled to the speaker module, wherein the speaker module includes: a speaker housing having a sound hole formed on a first surface; the audio output unit positioned inside the sound hole; a battery positioned inside the speaker housing; and a first magnet disposed adjacent to a second surface of the speaker housing, and the fixing module includes a second magnet coupled to the first magnet. The wearable speaker can be easily attached to and detached from a user's clothes and thus can be attached to existing clothes and detached when washing the clothes, thereby improving usability.

17 Claims, 10 Drawing Sheets

(51) Int. Cl.
*H02J 50/10* (2016.01)
*H02J 50/70* (2016.01)
*H04R 1/1025* (2026.01)

(52) U.S. Cl.
CPC ..... *H04R 1/1025* (2013.01); *H04R 2201/023* (2013.01); *H04R 2420/07* (2013.01)

(56) References Cited

U.S. PATENT DOCUMENTS

| | | | | |
|---|---|---|---|---|
| 9,264,791 B1* | 2/2016 | Polivy | H04R 1/025 | |
| 12,525,819 B2* | 1/2026 | Luo | H02J 50/005 | |
| 2014/0145673 A1* | 5/2014 | Heilbrun | H02J 7/50 | 320/107 |
| 2014/0361734 A1* | 12/2014 | Yamazaki | H01M 10/425 | 320/108 |
| 2015/0180270 A1* | 6/2015 | Takano | H01F 38/14 | 320/103 |
| 2020/0381924 A1* | 12/2020 | Lagnado | G06F 1/26 | |
| 2022/0311286 A1* | 9/2022 | Schwartz | H02J 50/90 | |
| 2022/0408168 A1* | 12/2022 | Zhu | H04R 1/028 | |

FOREIGN PATENT DOCUMENTS

| | | | |
|---|---|---|---|
| KR | 10-2011-0117330 | A | 10/2011 |
| KR | 20-0456386 | Y1 | 10/2011 |
| KR | 10-1247101 | B1 | 4/2013 |
| KR | 10-1563973 | B1 | 10/2015 |
| KR | 10-2020-0072167 | A | 6/2020 |
| KR | 10-2021-0074719 | A | 6/2021 |

* cited by examiner (a)

(b)

(a)

(b)

(c)

(a)

(b)

WEARABLE SPEAKER

CROSS REFERENCE TO RELATED APPLICATIONS

This application is the National Phase of International Application No. PCT/KR2022/006248 filed on May 2, 2022, which claims priority under 35 U.S.C. § 119 (a) to Patent Application No. 10-2022-0023256 filed in the Republic of Korea on Feb. 22, 2022, all of which are hereby expressly incorporated by reference into the present application.

TECHNICAL FIELD

The present disclosure relates to a wearable speaker detachably attached to user's clothing.

BACKGROUND ART

As portable electronic devices such as a laptop, a portable mobile terminal, a tablet, and the like increase in use, electronic devices are usable anywhere. Although the electronic device may simply provide only an image or text, it is possible to appreciate various contents through wireless communication using a smart phone, a tablet PC, or the like as 5G Long Term Evolution (LTE) is implemented by the development of a communication technology, thereby increasing consumption of video-type contents provided with audio.

Accordingly, the demand for portable sound devices is also increasing. Portable sound devices have traditionally been used by being connected to portable electronic devices in a wired manner, but in recent years, as short-range wireless communication such as Bluetooth is developed and battery performance is improved, the types of wireless portable sound devices are increasing.

In general, as a portable sound device, there is an in-ear type sound device. Yet, such a sound device directly provides sound to an ear, thereby influencing the auditory sense and having difficulty in providing a sense of space such as a speaker.

There is a need for a speaker in a form capable of listening to sounds with space sense while minimizing the transmission of sound to neighboring people even if the speaker is not used in a manner of being inserted into the external auditory meatus. In particular, there is a need for a speaker in the form that can be used during exercise or mountain climbing.

DISCLOSURE

Technical Tasks

One technical task of the present disclosure is to provide a wearable speaker easily attached/detached to/from user's clothing.

Another technical task of the present disclosure is to provide a wearable speaker having a charging structure for stacking and charging a plurality of speakers.

In addition, spatial sound may be implemented by changing the number of channels according to the number of attachment.

Technical Solutions

In one technical aspect of the present disclosure, provided is a wearable speaker, including a speaker module having an audio output unit mounted thereon and a fixing module coupled to the speaker module by magnetic force, wherein the speaker module may include a speaker housing having a sound hole formed in a first surface, the audio output unit positioned inside the sound hole, a battery positioned inside the speaker housing, and a first magnet disposed adjacent to a second surface of the speaker housing and wherein the fixing module may include a second magnet coupled to the first magnet.

The wearable speaker may further include a first magnetic shielding plate disposed on a first surface of the first magnet.

The first magnetic shielding plate may further include a side part covering a side surface of the first magnet.

The wearable speaker may further include a second magnetic shielding plate disposed on a second surface of the second magnet.

The wearable speaker may further include a second magnetic shielding plate disposed on a second surface of the second magnet.

The first magnet may have a ring shape and include an inner pole and an outer pole different from the inner pole.

The first magnet may have a ring shape and include a first pole positioned inside and a second pole positioned at an outer circumference of the first pole and forming a polarity opposite to that of the first pole.

A plurality of the first magnets may be disposed along a circumference of the wearable speaker and the first magnet may include a first pole positioned inside and a second pole positioned outside.

The first pole of the first magnet may have a polarity opposite to that of the first pole of the neighboring first magnet.

The speaker module may include a power receiver charging the battery from a charger disposed on the second surface and a power transmitter transmitting power to a speaker module stacked on the first surface.

The power receiver may include a charging terminal disposed on the second surface of the speaker housing and configured to charge the battery, and the power transmitter may include a transmitting terminal disposed on the first surface of the speaker housing and configured to provide power of the battery.

The power receiver may include a charging coil disposed adjacent to the second surface of the speaker housing and configured to charge the battery, and the power transmitter may include a transmitting coil disposed adjacent to the first surface of the speaker housing and configured to transmit power of the battery.

The wearable speaker may further include a controller configured to activate the power transmitter based on a charged amount of the battery greater than or equal to a reference value.

The speaker module may further include a third magnet disposed adjacent to the first surface and attached to the first magnet of the speaker module stacked on the first surface.

Advantageous Effects

The effects of a wearable speaker according to the present disclosure are described as follows.

According to at least one of embodiments of the present disclosure, the wearable speaker is easily attached to and detached from user's clothing so as to be attached to the existing clothing and removed for washing of the clothing, thereby improving usability.

In addition, when a plurality of speakers are used, spatial sound may be implemented by changing the number of channels.

The present disclosure may stack and charge a plurality of speakers, thereby resolving the inconvenience of connecting each individual speaker to a charger.

Further scope of applicability of the present disclosure will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BEST MODE

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Figure 1:
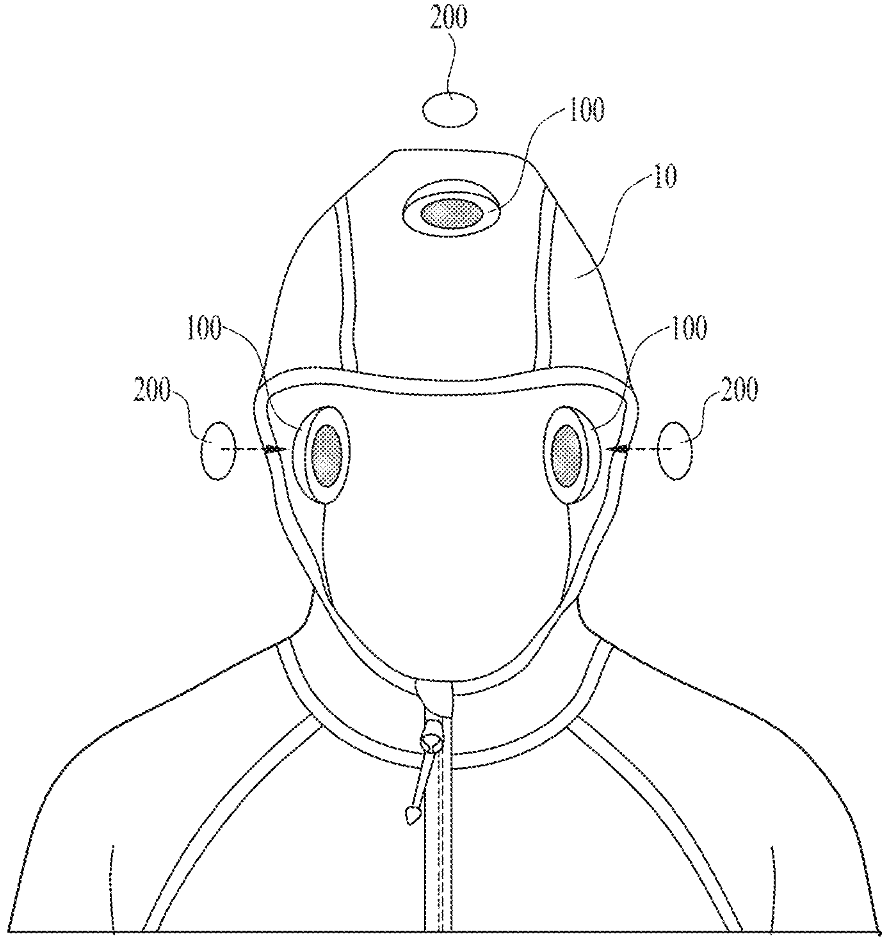
FIG. 1 is a diagram illustrating a method of attaching a wearable speaker of the present disclosure.

FIG. 1 is a diagram illustrating a method of attaching a wearable speaker according to an embodiment of the present disclosure. A wearable speaker is a speaker attachable to clothing, and is particularly characterized in being attached to an inside of a hood 10 to prevent sound from leaking to the outside and provide a sense of space.

A pair of speakers may be disposed on left and right sides to be used as stereo speakers, a single speaker disposed on a head side may be used as a mono speaker, or speakers may be disposed on left and right sides and an upper side or a rear surface to enable multi-channel sound to be appreciated.

A wearable device of the related art is generally worn on a body. When the wearable device is attached to clothing, Velcro is used or the wearable device is put in a pocket. Yet, a wearable speaker of the present disclosure is attachable to clothing by using a magnetic force of a magnet.

A wearable speaker includes a speaker module 100 on which an audio output unit 120 for outputting sound is mounted and a fixing module 200 for fixing the speaker module 100 to clothing. The speaker module 100 is disposed inside the hood 10 and the fixing module 200 is disposed outside to correspond to a position of the speaker module 100, whereby the speaker module 100 may be fixed thereto.

Figure 2:
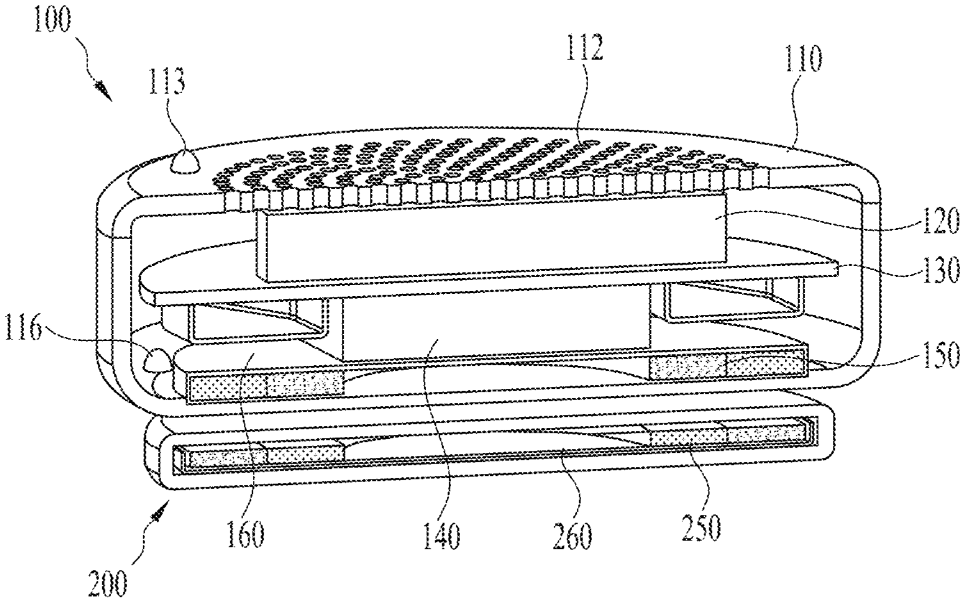
FIG. 2 is a cross-sectional diagram illustrating a wearable speaker according to an embodiment of the present disclosure.
Figure 3:
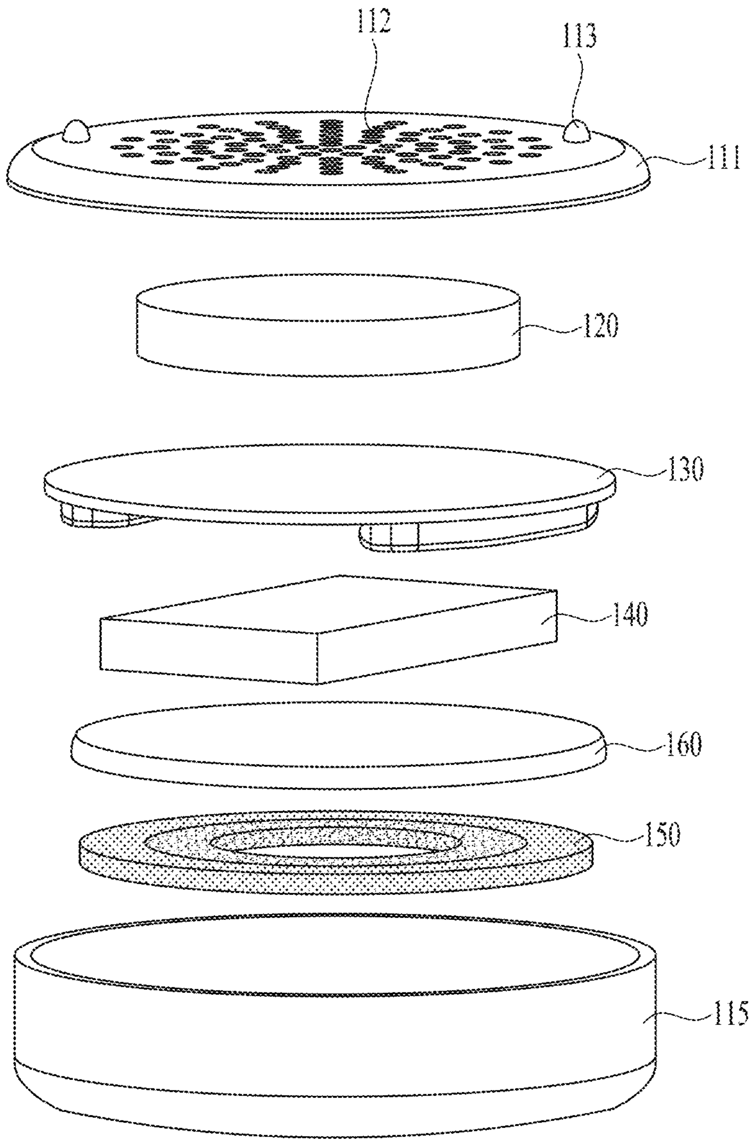
FIG. 3 is an exploded perspective diagram illustrating a speaker module of the wearable speaker according to an embodiment of the present disclosure.
Figure 4:
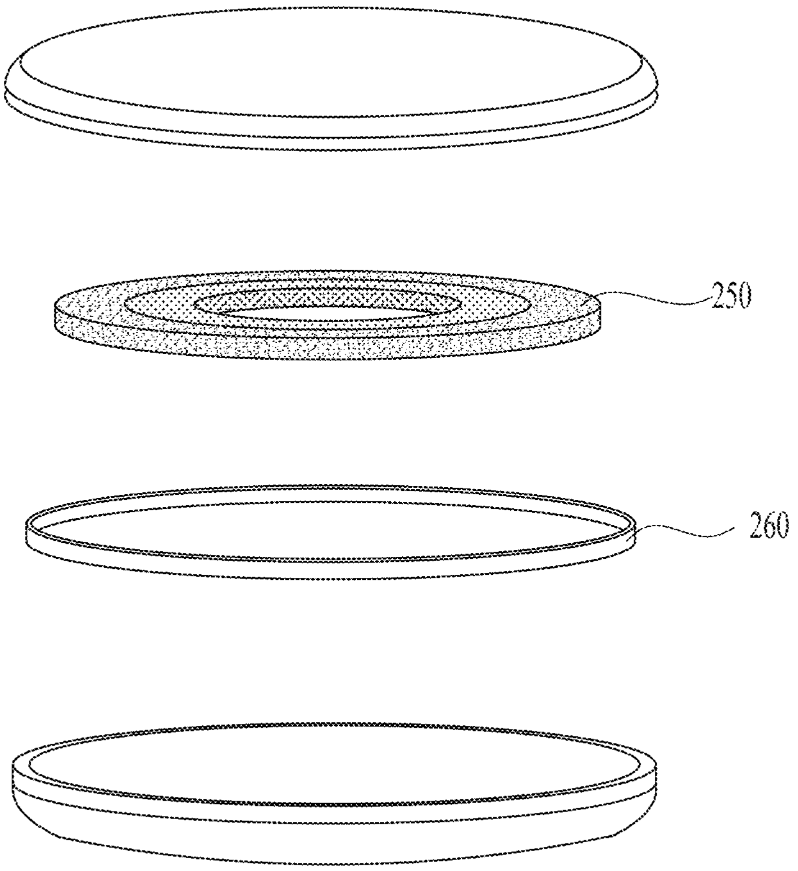
FIG. 4 is an exploded perspective diagram illustrating a fixing module of the wearable speaker according to an embodiment of the present disclosure.

FIG. 2 is a cross-sectional diagram illustrating a wearable speaker according to an embodiment of the present disclosure, FIG. 3 is an exploded perspective diagram illustrating the speaker module 100 of the wearable speaker according to an embodiment of the present disclosure, and FIG. 4 is an exploded perspective diagram illustrating the fixing module 200 of the wearable speaker according to an embodiment of the present disclosure.

The speaker module 100 may include a speaker housing 110 having an acoustic hole 112 formed in a first surface thereof, an audio output unit 120 disposed inside the acoustic hole 112, a battery 140 disposed inside the speaker housing 110, and a first magnet 150 disposed adjacent to a second surface of the speaker housing 110.

The speaker housing 110 forming the appearance of the speaker module 100 may include a first surface and a second surface opposite to the first surface and have a circular plate shape with a predetermined thickness. The first surface may not necessarily have a circular shape, may be rectangular, but may have a smaller thickness than the first surface and the second surface to be easily attached to clothing.

The first surface is a surface disposed toward a user's face and the second surface is a surface that abuts clothing. The speaker housing 100 may include a first housing 111 constituting the first surface and a second housing 115 constituting the second surface to facilitate component mounting.

The first surface of the speaker housing 110 may include a sound hole 112 to output sound. The audio output unit 120 may be disposed adjacent to the first surface.

In an earphone, since the audio output unit 120 is disposed in a limited space, a size of the audio output unit 120 should be reduced. However, since the speaker module 100 of the present disclosure has a size larger than that of the earphone, it may implement excellent sound quality at a low cost.

A battery 140 for supplying power to the audio output unit 120 may be disposed inside, and a board 130 may be disposed as a controller for controlling the audio output unit 120. The audio output unit 120 and the battery 140 may be seated on the board 130, and a bracket for fixing and connecting the battery 140 may be mounted on the board 130.

To be attached to the fixing module 200, the speaker module 100 may dispose a first magnet 150 on the second surface. The first magnet 150 may be disposed in a manner that a pole opposite to that of a second magnet 250 confronts the pole of the second magnet 250 so as to be attached to the second magnet 250 of the fixing module 200.

Figure 5:
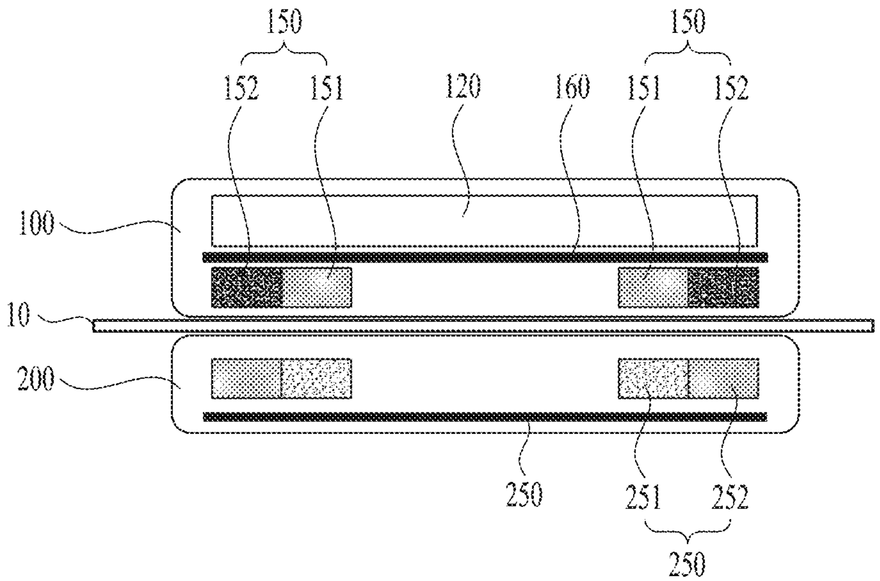
FIG. 5 is a cross-sectional diagram illustrating an arrangement of magnets of the wearable speaker according to an embodiment of the present disclosure.
Figure 5:
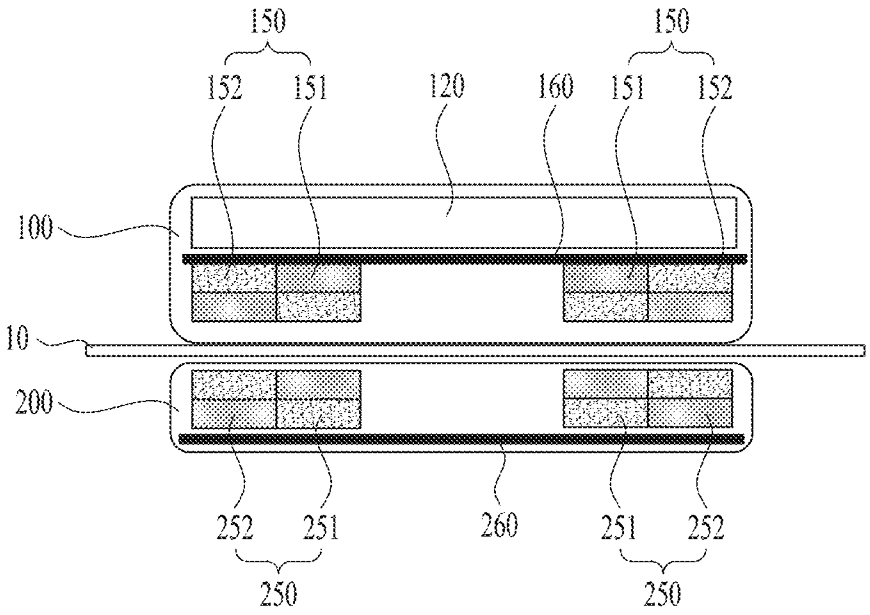
Figure 6:
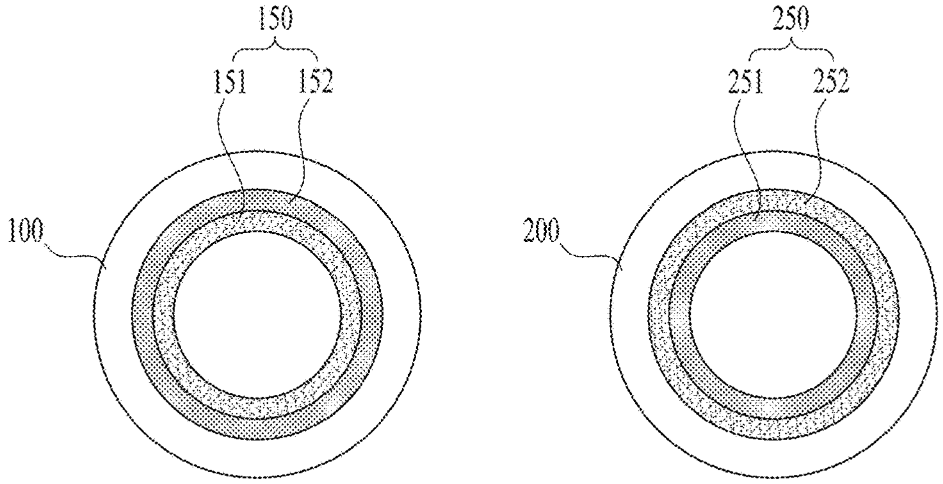
FIG. 6 is a layout illustrating an arrangement of magnets of the wearable speaker according to an embodiment of the present disclosure.
Figure 6:
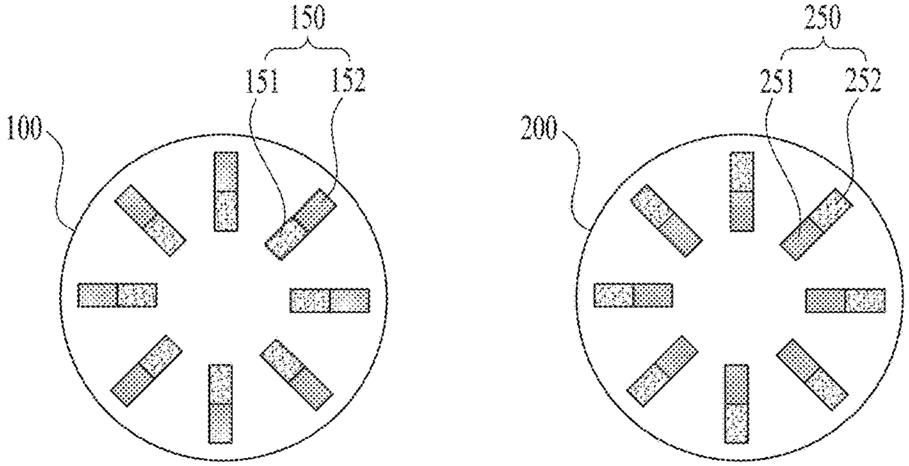
Figure 6:
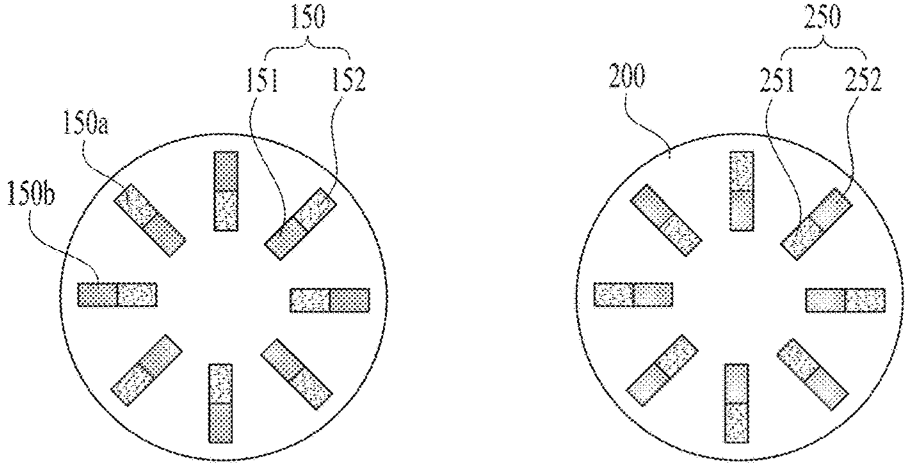

FIG. 5 is a cross-sectional diagram illustrating an arrangement of magnets of the wearable speaker according to an embodiment of the present disclosure, and FIG. 6 is a layout illustrating an arrangement of magnets of the wearable speaker according to an embodiment of the present disclosure.

Only one pole (e.g., N-pole or S-pole) facing a second surface of the first magnet 150 may be disposed. Instead, a first pole 151 and a second pole 152, which are different poles, may be separately disposed so that the fixing module 200 and the speaker module 100 may be disposed at the right position. The first pole 151 is a pole located in a center direction (i.e., an inward direction), and the second pole 152 is a pole located in an outward direction. For example, if the first pole 151 is N-pole, the second pole 152 may be S-pole.

In this case, the first pole 251 and the second pole 252 of the fixing module 200 facing the speaker module 100 may be S-pole and N-pole, respectively.

As shown in FIG. 5 (*a*), the first pole 151 and the second pole 152 may be disposed in a horizontal direction. As shown in FIG. 5 (*b*), a magnet having N-pole and S-pole disposed in a vertical direction may be used.

In this case, the poles of the inner magnet located inside and the outer magnet located outside are disposed to face opposite directions (e.g., in a vertical direction in the drawing), and the first pole 151 and the second pole 152 facing the second surface may have different polarities.

As for the horizontal shape, as shown in FIG. 6 (*a*), the first magnet 150 and the second magnet 150 may have a ring shape. As shown in FIG. 6 (*b*) and FIG. 6 (*c*), a plurality of bar-type magnets disposed radially may be used.

For the representation in the drawing, a size of each first magnet 150 may be large. Instead, the first magnet 150 is formed small to have the same size as the ring-shaped magnet of (a) and a larger number of the first magnets 150 may be radially disposed. It is advantageous in that the bar-type magnet may be more easily fabricated than the ring-shaped magnet.

As shown in FIG. 6 (*b*), first poles 151 and second poles 152 of a plurality of first magnets 150 may be disposed to have the same polarities, respectively. A first pole 251 and a second pole 252 of the second magnet 250 of the fixing module 200 may be configured to have different polarities from the first pole 151 and the second pole 152 of the first magnet 150, respectively.

For example, as a plurality of the first magnets 150, a plurality of bar-shaped magnets may be disposed so that S-pole and N-pole face an inside (first pole 151) and an outside, respectively. As for the second magnet 250, a plurality of bar-type magnets 250 may be disposed so that N-pole and S-pole face an inside and an outside, respectively.

As shown in FIG. 6 (*c*), neighboring first magnets 150 may be disposed to have different polarities. When a first pole 151 and a second pole 152 of a single first magnet 150*a* are N-pole and S-pole, respectively, a first pole 151 and a second pole 152 of a neighboring first magnet 150*b* may be arranged to be S-pole and N-pole, respectively. Second magnets 250 may also be disposed such that first poles 251 and second poles 252 of neighboring magnets are different from each other in polarities.

Such disposition of the first magnet 150 and the second magnet 250 may not only prevent the speaker from moving in a linear direction, but also block the rotation of the speaker.

Since the audio output unit 120 includes a magnet to generate the vibration of a vibration plate, ae magnetic force of the first magnet 150 may affect the magnet in the audio output unit 120, thereby reducing the performance of the audio output unit 120.

The magnetic force of the first magnet 150 is used for coupling with the second magnet 250 of the fixing module 200, and a first magnetic shielding plate 160 may be further included to minimize an influence on other components.

Since the first magnet 150 is disposed adjacent to the second surface of the speaker module 100, the first magnetic shielding plate may be disposed in a first surface direction of the first magnet 150 to shield the audio output unit 120 positioned in the first surface direction than the first magnet 150 or the component mounted on the board 130 against the magnetic force.

The second magnet 250 may further include a second magnetic shielding plate 260 in a second surface direction opposite to the first surface fastened to the first magnet 150 to concentrate magnetic force on fastening to the first magnet 150 of the speaker module 100.

In FIG. 5, the first magnetic shielding plate and the second magnetic shielding plate may have planar plate shapes, but may further include, as shown in FIG. 3 and FIG. 4, sidewalls covering side surfaces of the first magnet 150 and the second magnet 250, respectively.

Although only the outer side surfaces of the first magnet 150 and the second magnet 250 are covered in the drawing, a sidewall, which covers a side surface of a hole formed inside to match the shape of each of the ring-shaped first and second magnets 150 and 250, may be further included.

Figure 7:
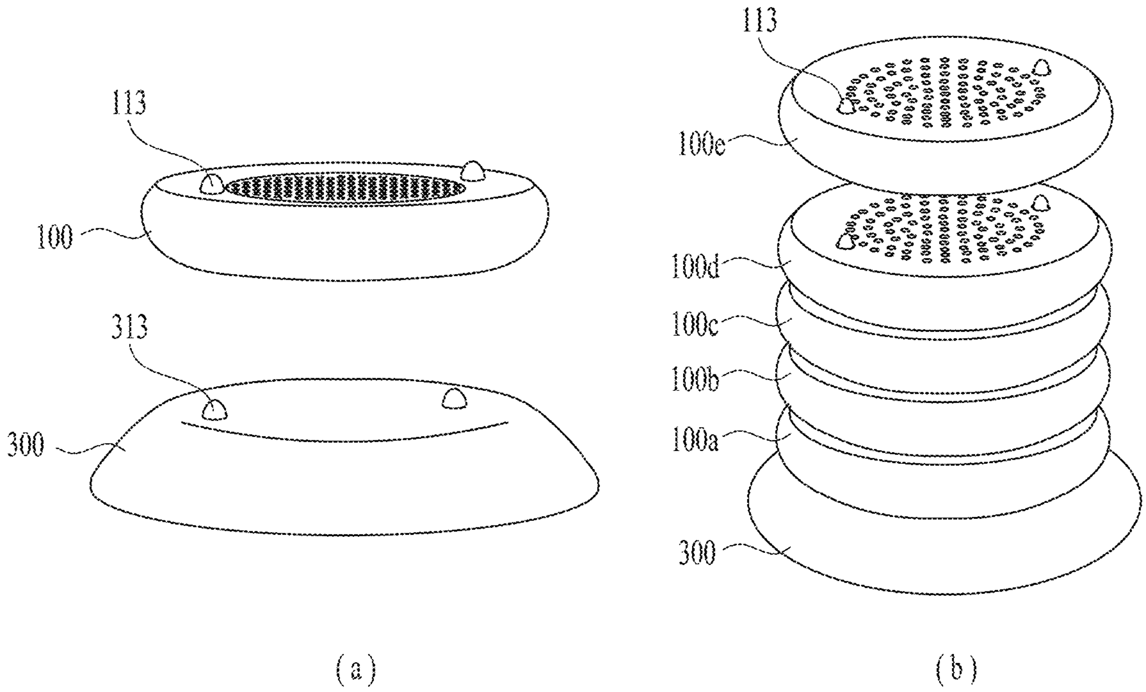
FIG. 7 is a diagram illustrating a charging method of the wearable speaker according to an embodiment of the present disclosure.

FIG. 7 is a diagram illustrating a charging method of a wearable speaker according to an embodiment of the present disclosure.

The wearable speaker of the present disclosure is characterized in simultaneously using a plurality of the speaker modules 100*a*, 100*b*, 100*c*, 100*d*, 100*e*. Accordingly, when a user connects a plurality of the speaker modules 100*a*, 100*b*, 100*c*, 100*d*, 100*e* to charging plugs, respectively upon charging after using a plurality of the speaker modules 100, it may cause inconvenience to the user. Hence, as shown in FIG. 7, the charging may be performed in a manner of stacking the speaker modules 100*a*, 100*b*, 100*c*, 100*d*, 100*e* on a charger 300.

Accordingly, the speaker module 100 may include a power receiving unit for receiving power and charging the battery 140 and a power supply unit for supplying the power of the battery 140 to other speaker modules 100.

As shown in FIG. 7 (*a*), when the charger 300 is mounted on a floor, the speaker module 100 may be charged in a manner of being put on a surface opposite to the mounting surface, i.e., an upper surface of the charger 300. A transmitting terminal 313 connected to the speaker module 100 may be provided on the mounting surface of the charger 300, and the transmitting terminal 113 may be connected to a charging terminal 116 located on the second surface of the speaker housing 110 of the speaker module 100. The speaker module 100 may receive power through the charging terminals 116 to charge the battery 140.

In order to charge a plurality of the speaker modules 100, a second speaker module 100 may be additionally stacked on a first speaker module 100 (on the first surface) seated on the charger 300. The transmitting terminal 113 for transmitting power to the first surface of the first speaker module 100 may be included.

The transmitting terminal 113 of the first speaker may be connected to the charging terminal 116 of the second speaker and may provide the power of the battery 140 of the first speaker.

As shown in FIG. 7 (*b*), two or more speaker modules 100 may be stacked and charged. After a speaker module adjacent to the charger 300 is charged first, the rest of the speaker modules 100 above the charged speaker module may be charged sequentially. A detailed charging method will be described later with reference to FIG. 10.

Figure 8:
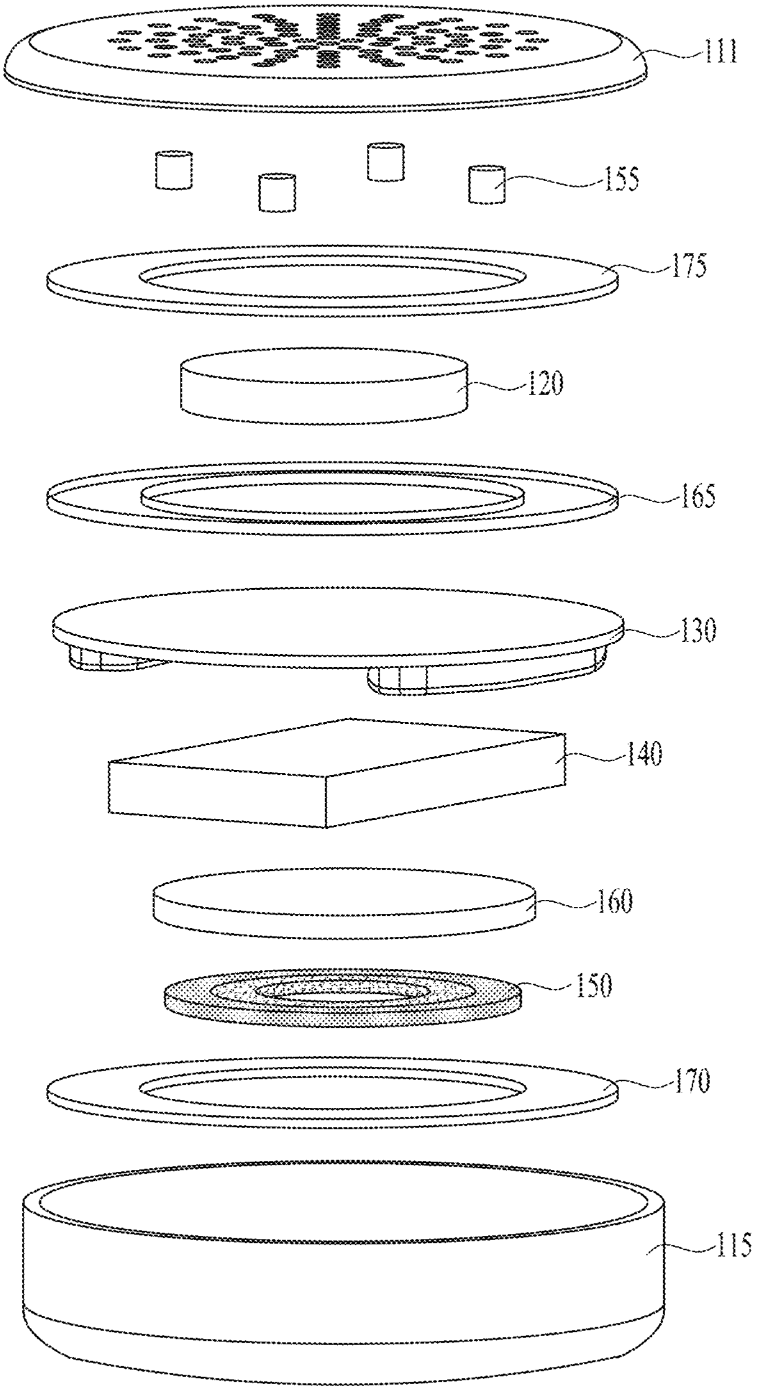
FIG. 8 is an exploded perspective diagram illustrating a wearable speaker according to another embodiment of the present disclosure.
Figure 9:
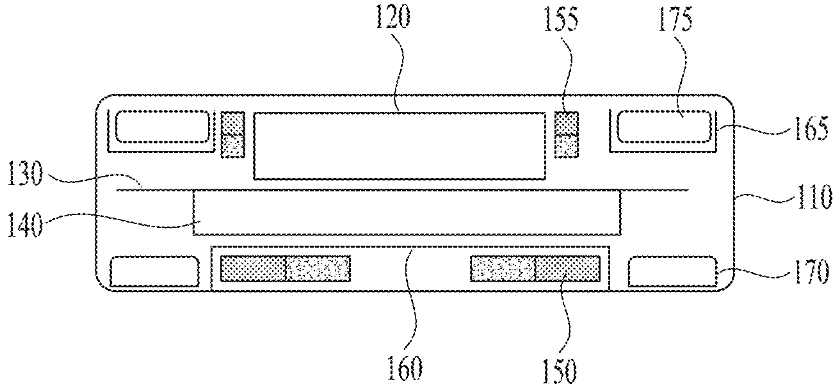
FIG. 9 is a cross-sectional diagram illustrating a wearable speaker according to another embodiment of the present disclosure.
Figure 9:
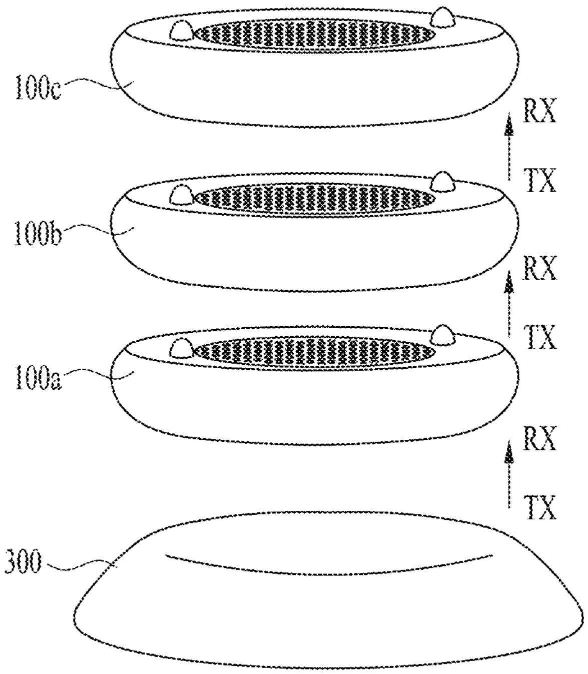

FIG. 8 is an exploded perspective diagram illustrating a speaker module 100 of a wearable speaker according to another embodiment of the present disclosure, and FIG. 9 is a cross-sectional diagram illustrating a speaker module 100 of a wearable speaker according to another embodiment of the present disclosure.

A speaker module 100 of the present embodiment is similar to that of the foregoing embodiment in the disposition of the magnet, the audio output unit 120, the battery 140, and the like, but there is a difference in the configuration of a power transmitting unit and a power receiving unit.

According to the embodiment of FIG. 7, the speaker module 100 requires the charging terminal 116 and the transmitting terminal 113 for charging and power transmission. The terminal may prevent water from penetrating into the inside using a waterproof member. Yet, as the terminal is exposed externally, it is vulnerable in terms of durability. In addition, as the terminal is different from the standard terminal (e.g., C-type terminal, 5-pin type, etc.) of the portable electronic device, only the designated charger 300 should be used.

The power receiving unit and the power transmitting unit of the present embodiment are implemented by a wireless charging system, and a charging coil 170 and a transmitting coil 175 may be included instead of the charging terminal 116 and the transmitting terminal 113. The charging coil 170 may be disposed adjacent to the second surface and the transmitting coil 175 may be disposed adjacent to the first surface.

The charging coil 170 may charge the battery 140 while a current flows through the magnetic field of the power transmitting coil 175 of the charger 300, and the transmitting coil 175 may receive power from the battery 140 and induce the other speaker module 100 stacked on the first surface to make a current flow through the charging coil 170.

When the wireless charging system is used, charging may be performed using the wireless charger 300 used in the mobile terminal, and thus there is no limitation on the charger 300 advantageously.

The first magnet 150 coupled to the second magnet 250 of the fixing module 200 is disposed in the second surface direction in which the charging coil 170 is disposed. To prevent interference between the two members, as shown in FIG. 8, the first magnet 150 may be disposed inside the charging coil 170 to have a different diameter.

Meanwhile, the first magnetic shielding plate may include a sidewall part positioned between the first magnet 150 and the charging coil 170 so that the magnetic force of the first magnet 150 does not affect the charging coil 170. The first magnetic shielding plate may surround the circumference of the first magnet 150 except a surface that faces the second surface.

The transmitting coil 175, which is the power transmitting unit, may be disposed on the first surface. The transmitting coil 175 may be disposed on an outer circumference of the audio output unit 120 so that the sound outputted from the audio output unit 120 is outputted to the sound hole 112 of the speaker housing 110.

In the aforementioned embodiment of FIG. 7, as the charging terminal 116 is concave and the transmitting terminal 113 protrudes, when the transmitting terminal 113 is inserted into the charging terminal 116, the stacked speaker module 100 may be supported so as not to fall. Yet, the present embodiment may further include an additional configuration for fixing without the transmitting terminal 113 and the charging terminal 116.

Although not functioning as an electrode, unevenness may be formed in the speaker housing 110 to be engaged with the neighboring speaker housing 110, or as illustrated in FIG. 8 and FIG. 9, a third magnet 155 may be used.

The third magnet 155 may be disposed to face the first surface and may be coupled to the first magnet 150 of the speaker module 100 stacked on the first surface. Since the third magnet 155 should be vertically aligned with the first magnet 150, the third magnet 155 may be positioned inside the transmitting coil 175.

The third magnet 155 may be coupled to one of the first pole 151 or the second pole 152 of the first magnet 150 of the speaker module 100 stacked on the first surface. Since it is not fixed like the fixing module 200 and the speaker module in a moving state, a strong magnetic force is unnecessary, and thus, as shown in FIG. 8 and FIG. 9, a small-sized magnet may be used as the third magnet 155.

The third magnet 155 may be disposed between the audio output unit 120 and the transmitting coil 175 so as not to overlap the audio output unit 120, and may be disposed in a space between each side of the audio output unit 120 and the transmitting coil 175 when the audio output unit 120 is rectangular.

A third power shield (third magnetic shielding plate) 165 may be further provided between the third magnet 155 and the transmitting coil 175 so that the third magnet 155 does not affect the transmitting coil 175. As illustrated in FIG. 9, the third power shield may be provided to cover the transmitting coil 175, or the third power shield may be provided to cover the third magnet 155.

The third magnet 155 may be coupled to the first magnet 150 to maintain the stacked state, and the transmitting coil 175 and the charging coil 170 may be aligned at an accurate position. The battery 140 of the first speaker module 100*a* located at the lowermost position is charged first with the power supplied from the charger 300. When the battery 140 of the first speaker module 100*a* is charged more than a predetermined reference, the transmitting coil 175 of the first speaker module 100*a* is activated to charge the battery 140 of the second speaker module 100*b* through the charging coil 170 of the second speaker module 100*b* located at the first surface of the first speaker module 100*a*.

A charging flow of a plurality of the speaker modules 100 will be described in more detail with reference to FIG. 10.

Figure 10:
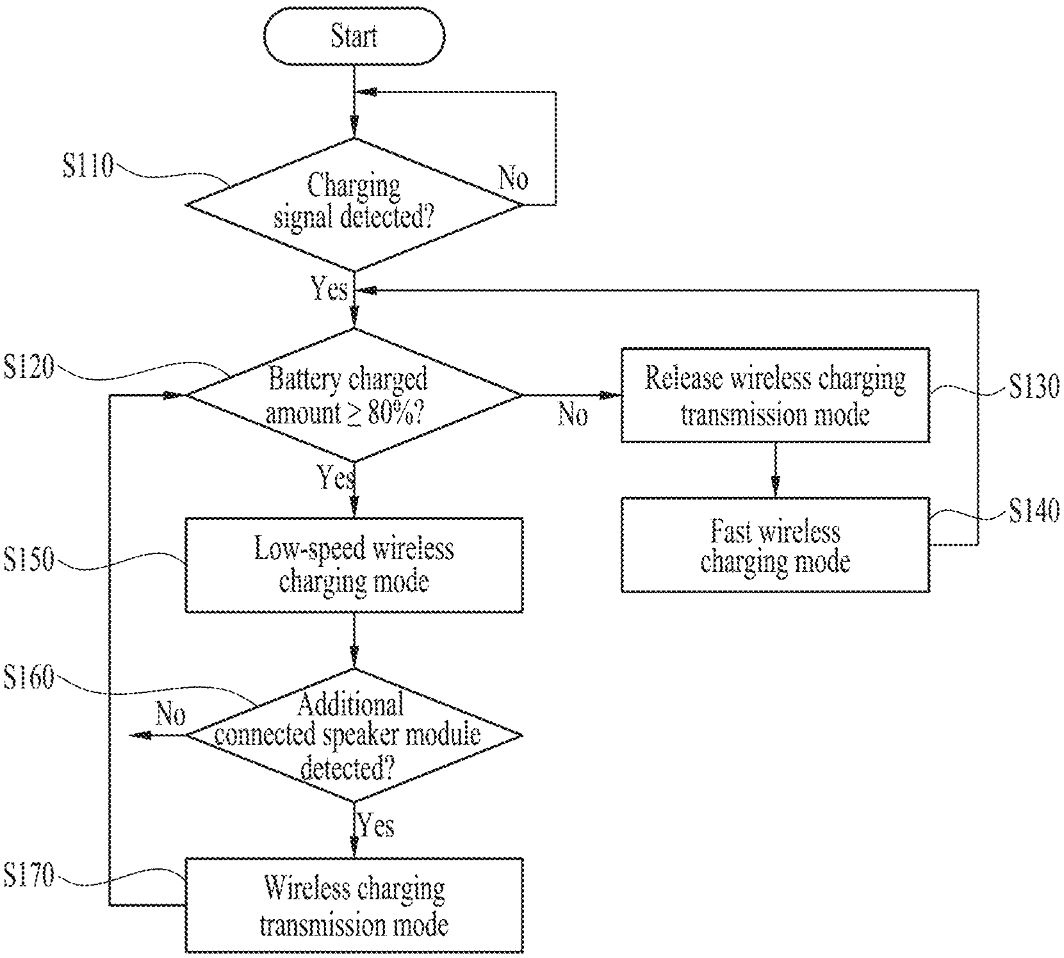
FIG. 10 is a flowchart illustrating a method of controlling a wearable speaker according to an embodiment of the present disclosure.

FIG. 10 is a flowchart illustrating a method of controlling a wearable speaker according to the present disclosure. The controller of the speaker module 100 may sense a charging signal based on whether a current of the charging coil 170 is changed or may determine whether an additional connected speaker module 100 is present.

In addition, the controller of the speaker module 100 of the present disclosure may control a charging speed according to a remaining charged amount of the battery 140 and also control the battery 140, the charging coil 170, and the transmitting coil 175 to supply power to the stacked charger 300.

First, when the speaker module 100 is placed on the charger 300, a current may flow to the charging coil 170 of the speaker module 100 to recognize that it is placed on the charger 300. This may be referred to as a charging signal. When the charging signal is detected (S110), charging starts.

If the charged amount of the battery 140 is equal to or greater than a reference value (S120), fast charging is not necessarily required, and thus charging may be performed in a low-speed wireless charging mode (S150). In the present embodiment, it may be determined that a reference value for charging in the low-speed wireless charging mode is satisfied when the charged amount of the battery 140 is 80% or more.

When the charged amount of the battery 140 is less than or equal to the reference value, the received power is first used to charge the battery 140 without applying a current to the transmitting coil 175. That is, a wireless charging transmission mode may be released (S130), and the battery 140 may be quickly charged in a high-speed wireless charging mode (S140).

Since the low-speed charging is more advantageous for the life of the battery 140, fast charging is possible through high-speed charging. Hence, the high-speed wireless charging mode or the low-speed wireless charging mode may be selected according to the charged amount of the battery 140.

When an additional connected speaker module is detected (S160) in a state in which the charged amount of the battery 140 is greater than or equal to the reference value, that is, in the low-speed wireless charging mode (S150), it is switched to the wireless charging transmission mode (S170). A current may be applied to the transmitting coil 175 to transmit power to the charging coil 170 of the additional connected speaker module 100.

When the charged amount of the battery 140 is less than or equal to the reference value (S120), the wireless charging transmission mode may be released again and the high-speed wireless charging may be performed (S130, S140).

According to at least one of embodiments of the present disclosure, the wearable speaker is easily attached to and detached from user's clothing so as to be attached to the existing clothing and removed for washing of the clothing, thereby improving usability.

In addition, when a plurality of wearable speakers are used, spatial sound may be implemented by changing the number of channels.

The present disclosure may stack and charge a plurality of speakers, thereby resolving the inconvenience of connecting each individual speaker to the charger 300.

The above detailed description should not be construed as being limitative in all terms, but should be considered as being illustrative. The scope of the present disclosure should be determined by reasonable analysis of the accompanying claims, and all changes in the equivalent range of the present invention are included in the scope of the present disclosure.

What is claimed is:

1. A wearable speaker, comprising:
- a speaker module having an audio output unit mounted thereon; and
- a fixing module coupled to the speaker module by magnetic force,
- wherein the speaker module comprises:
  - a speaker housing having a sound hole formed in a first surface,
  - the audio output unit positioned inside the sound hole,
  - a battery positioned inside the speaker housing, and
  - a first magnet disposed adjacent to a second surface of the speaker housing, and
- wherein the fixing module comprises:
  - a second magnet having a first surface coupled to the first magnet by magnetic force, and
  - a second magnetic shielding plate disposed on a second surface of the second magnet and configured to concentrate magnetic force of the second magnet towards the first surface of the second magnet.

2. The wearable speaker of claim 1, further comprising a first magnetic shielding plate disposed on a first surface of the first magnet.

3. The wearable speaker of claim 2, wherein the first magnetic shielding plate further comprises a side part covering a side surface of the first magnet.

4. The wearable speaker of claim 1, wherein the first magnet has a ring shape and comprises an inner pole and an outer pole different from the inner pole.

5. The wearable speaker of claim 1, wherein the first magnet has a ring shape and comprises a first pole positioned inside and a second pole positioned at an outer circumference of the first pole and forming a polarity opposite to that of the first pole.

6. The wearable speaker of claim 1, wherein a plurality of the first magnets are disposed along a circumference of the wearable speaker, and
- wherein the first magnet comprises a first pole positioned inside and a second pole positioned outside.

7. The wearable speaker of claim 6, wherein the first pole of the first magnet has a polarity opposite to that of the first pole of a neighboring first magnet.

8. The wearable speaker of claim 1, wherein the speaker module further comprises:
- a power receiver configured to charge the battery from a charger disposed on the second surface of the speaker housing; and
- a power transmitter configured to transmit power to another speaker module stacked on the first surface of the speaker housing.

9. The wearable speaker of claim 8, wherein the power receiver comprises a charging terminal disposed on the second surface of the speaker housing and configured to charge the battery, and
- wherein the power transmitter comprises a transmitting terminal disposed on the first surface of the speaker housing and configured to provide power of the battery.

10. The wearable speaker of claim 8, wherein the power receiver comprises a charging coil disposed adjacent to the second surface of the speaker housing and configured to charge the battery, and wherein the power transmitter comprises a transmitting coil disposed adjacent to the first surface of the speaker housing and configured to transmit power of the battery.

11. The wearable speaker of claim 8, further comprising a controller configured to activate the power transmitter based on a charged amount of the battery greater than or equal to a reference value.

12. The wearable speaker of claim 8, wherein the speaker module further comprises a third magnet disposed adjacent to the first surface of the speaker housing and attached to a first magnet of the another speaker module stacked on the first surface of the speaker housing.

13. A wearable speaker, comprising:

a speaker module having an audio output unit mounted thereon and configured to be stackable with another speaker module; and a fixing module coupled to the speaker module by magnetic force, wherein the speaker module comprises:

a speaker housing having a sound hole formed in a first surface, the audio output unit positioned inside the sound hole, a battery positioned inside the speaker housing, a first magnet disposed adjacent to a second surface of the speaker housing, the first magnet having a ring shape and comprising an inner pole and an outer pole different from the inner pole, and a third magnet disposed along a circumference of the audio output unit, wherein the fixing module comprises a second magnet having a first surface coupled to the first magnet by magnetic force, and wherein the third magnet is configured to be magnetically coupled to the outer pole of a first magnet of the another speaker module stacked on the first surface of the speaker housing.

14. The wearable speaker of claim 13, wherein the inner pole of the first magnet overlaps the audio output unit.

15. The wearable speaker of claim 13, wherein the speaker module further comprises:

a power receiver configured to charge the battery from a charger disposed on the second surface of the speaker housing; and a power transmitter configured to transmit power to the another speaker module stacked on the first surface of the speaker housing.

16. The wearable speaker of claim 15, wherein the power receiver comprises a charging coil disposed adjacent to the second surface of the speaker housing and configured to charge the battery, and wherein the power transmitter comprises a transmitting coil disposed adjacent to the first surface of the speaker housing and configured to transmit power of the battery.

17. The wearable speaker of claim 16, wherein the speaker module further comprises a third magnetic shielding plate configured to shield magnetic force between the third magnet and the power transmitter.

* * * * *